H. O. V. BERGSTRÖM.
METHOD OF DISTILLING LIQUID MIXTURES OR SOLUTIONS.
APPLICATION FILED JAN. 8, 1917.
1,271,654.
Patented July 9, 1918.
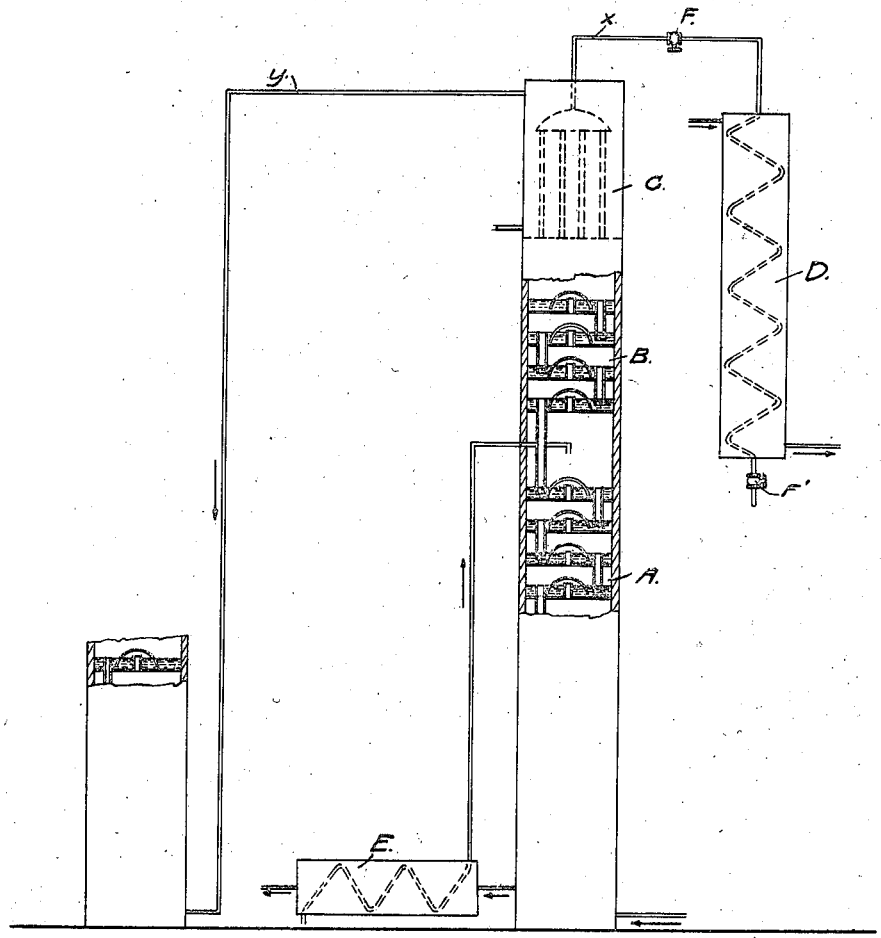
H.O.V. Bergström,
Inventor.
By *Albert Parker*
Attorney.

UNITED STATES PATENT OFFICE.

HILDING OLOF VIDAR BERGSTRÖM, OF STOCKHOLM, SWEDEN.

METHOD OF DISTILLING LIQUID MIXTURES OR SOLUTIONS.

1,271,654.            Specification of Letters Patent.      Patented July 9, 1918.

Application filed January 8, 1917. Serial No. 141,204.

*To all whom it may concern:*

Be it known that I, HILDING OLOF VIDAR BERGSTRÖM, a subject of the King of Sweden, and resident of 5 Baldersgatan, Stockholm, Sweden, have invented certain new and useful Improvements in Methods of Distilling Liquid Mixtures or Solutions, of which the following is a specification.

The present invention has for its object a method of distilling liquid mixtures or solutions for the purpose of driving off volatile substances, said method being principally characterized by the fact that the heat of the vapors generated during the distilling process is utilized for generating steam or vapor from the agent, generally water, which is used for cooling the same. This result is obtained by maintaining between the boiling point of the cooling agent in the cooler or coolers and the temperature of condensation of the vapors in said cooler or coolers a sufficient difference for enabling the vapors to generate steam from the cooling agent. This is rendered possible either by performing the distilling process under such a high pressure that the vapors obtain a temperature which is required for said generating of steam, or by applying a vacuum to the cooling agent, or finally by a combination of both these methods.

Although the invention may be applied to any distilling apparatus in which the vapors developed during the distilling process are cooled by means of a cooling liquid, it is specially suitable to apply the same in connection with column apparatus, principally column apparatus working continuously.

The steam generated from the cooling agent may wholly or partially be used for distillation purposes or other purposes for which steam is used in industrial work, for instance for drying purposes, the object of the invention being to save the costs required for said purposes.

The present invention is specially adapted for the distillation of highly diluted solutions, for instance methyl and ethyl alcohol solutions such as they are obtained in treating by-products from the manufacturing of cellulose and the like. It is only by applying the present invention that the distilling off of the alcohol from such diluted solutions can be rendered economical which is not the case in column apparatus working in the ordinary manner, this being due to the fact that the consumption of steam in such apparatus has hitherto been too high for making possible an economical recovering of the alcohol contained in such diluted solutions.

In the following specification a practical form of the present invention is described as applied to a continuous column apparatus adapted for recovering alcohol from a diluted solution by distillation. Such an apparatus which is illustrated on the accompanying drawing consists, as is well known to those skilled in the art, of the following parts:

1. The vaporizing compartment A where the spirit is vaporized by means of steam and from the lower part of which the solution deprived of spirit is drawn off.

2. The concentration compartment B where the vapors generated in the vaporizing compartment and rising from the same are concentrated and enriched with spirit.

3. The dephlegmator C where the vapors are partly condensed so as to form a return liquid necessary for the concentration.

4. The cooler D in which the vapors distilling off are condensed.

For vaporizing the volatile substances and for concentrating the same in such a column apparatus considerable quantities of steam are generally required. As an example it may be indicated that the consumption of steam for vaporizing diluted ethyl alcohol solutions and for concentrating the vapors about 15 per cent., and for diluted methyl-alcohol solutions about 25 per cent. are generally required as calculated on the incoming solution.

If the solution be introduced into the vaporizing compartment at a temperature which is about the boiling point of the same, the process of vaporizing and concentrating requires just the same quantity of heat (no account being made of losses) as that absorbed in the dephlegmator C and in the cooler D on condensing the vapors and cooling down the condensates, that is to say, the cooling water from the dephlegmator and from the cooler contain the heat required for the vaporizing and concentrating processes.

The said quantity of heat may now, according to my present invention, be obtained in the form of steam if the distillation is executed under such a pressure, that is to say at such a temperature that the vapors coming from the concentrating compartment and entering the dephlegmator can generate steam from the cooling water in the latter, and, if wanted, also from the cooling water in the cooler. The steam thus obtained corresponds, if the solution is introduced into the vaporizing compartment at its boiling point, to the amount of steam required for the vaporizing and concentrating processes, if no account be made for losses of heat.

However, this complete recovering of steam implies, as mentioned above that the solution is introduced into the vaporizing compartment at its boiling point. Now, the solution deprived of spirit and drawn off from the vaporizing compartment forms a source of heat which is sufficient for heating the incoming solution to or nearly to the boiling point. Even other warm products from the factory may be used, for instance flue gases, if wanted in combination with preheating of the entering solution by the drawn off solution.

The preheating of the incoming solution is executed in a special preheater E from which the solution is at nearly its boiling point, introduced into the vaporizing compartment of the column apparatus. Then the distillation of the same takes place under a pressure which makes it possible for the vapors to generate steam from the cooling water as well in the dephlegmator as, if wanted, in the cooler D. The vapors not condensed in the dephlegmator then escape through the conduit $x$ into the cooler D where they are condensed.

The pressure in the distillation apparatus may be obtained by means of a valve F or the like located in the conduit $x$, said valve being preferably so arranged that it opens itself only at the desired pressure.

It is evident that, according to the present invention, the valve F or similar device employed for producing a pressure must be located on the outlet side of the cooler in which steam is to be generated. In the example shown on the drawing it is supposed that steam is to be generated only in the dephlegmator. However, if steam is to be generated also in the cooler D, said valve must be located on the outlet side of the said cooler, $e. g.$ at F′. Consequently the above mentioned pressure is to be maintained not only in the distillation apparatus but also in the cooler or coolers, from the cooling agent of which steam is to be generated.

In the apparatus shown in the drawing the steam is led off through the conduit $y$ and is introduced into the next column apparatus in the battery where it acts as heating steam. It may also be introduced into the vaporizing compartment of the same column apparatus but in such a case its pressure must be augmented by means of a pump or the like.

Moreover, the steam may, as mentioned above, be utilized for other purposes than for distillation. For example, if the above described apparatus is employed in a so called "sulfite spirit factory" (where alcohol is manufactured from the waste lye of sulfite cellulose mills) the steam from the cooling water may wholly or partly be utilized for drying the cellulose.

However, steam can, as mentioned above, be generated from the cooling water not only in the described manner, viz., by maintaining a pressure in the distilling apparatus and in the cooler or coolers, but also by maintaining a vacuum on the cooling agent. Finally, steam may also be generated from the cooling agent by a combination of the above described methods, $i. e.$ by applying a pressure in the distilling apparatus and coolers and a vacuum on the cooling agent.

It is to be noted that a dephlegmator is nothing but a special kind of a cooler and, consequently, the term "cooler" is in the claims used as a generic expression for any kind of cooling apparatus where the vapors are cooled and condensed.

It is obvious that several modifications may be made in the above described practical forms of the process without departing from the scope of the invention, the characteristic feature of which is the utilizing of the vapors formed during the distillation process for generating steam from the cooling agent.

Having thus described my invention, what I claim and desire to secure by Patent is:

1. A method of distilling a relatively small amount of alcohol from a larger amount of an aqueous liquid, which comprises boiling the mixture in a column still, while treating the incoming mixture with the vapors produced in said boiling operation, and with a heating agent, treating the vapors given off in such boiling operation with condensate produced from like vapors and dephlegmating the vapors; bringing the so-treated vapors into heat-exchanging relation with a condensing cooling fluid, while said cooling fluid is maintained at a pressure sufficiently below the pressure of the vapors, to produce boiling of said cooling fluid, thereby producing steam in commercially useful quantities.

2. The method of treating liquid mixtures containing a small percentage of alcohol in a column apparatus for the purpose of distilling off the alcohol content thereof, which process includes the steps of boiling said liquid mixture under superatmospheric pressure in a column apparatus, maintaining within such column and in the vapor space of the condenser, a pressure above atmospheric, cooling and condensing said vapors by maintaining an aqueous liquid in heat-exchanging relation with said vapors, while maintaining a pressure on said aqueous liquid which is materially below the pressure of the vapors, whereby steam is generated in industrial quantities, and directing such steam into contact with a further amount of the alcoholic liquid to be distilled.

In witness whereof, I have hereunto signed my name.

HILDING OLOF VIDAR BERGSTRÖM.